(12) United States Patent
Lee (10) Patent No.: US 10,733,113 B2
(45) Date of Patent: Aug. 4, 2020

(54) MEMORY SYSTEM HAVING NONVOLATILE MEMORY AND VOLATILE MEMORY

(71) Applicant: SK hynix Inc., Icheon-si, Gyeonggi-do (KR)

(72) Inventor: Jae Young Lee, Icheon-si (KR)

(73) Assignee: SK hynix Inc., Icheon-si, Gyeonggi-do (KR)

( * ) Notice: Subject to any disclaimer, the term of this patent is extended or adjusted under 35 U.S.C. 154(b) by 77 days.

(21) Appl. No.: 15/492,222

(22) Filed: Apr. 20, 2017

(65) Prior Publication Data

US 2018/0032445 A1 Feb. 1, 2018

(30) Foreign Application Priority Data

Jul. 27, 2016 (KR) .................. 10-2016-0095557

(51) Int. Cl.
| | |
|---|---|
| G06F 12/10 | (2016.01) |
| G06F 12/12 | (2016.01) |
| G06F 12/0868 | (2016.01) |
| G06F 12/0893 | (2016.01) |
| G06F 3/06 | (2006.01) |
| G06F 12/0891 | (2016.01) |
| G06F 12/1009 | (2016.01) |

(52) U.S. Cl.
CPC .......... *G06F 12/12* (2013.01); *G06F 3/0619* (2013.01); *G06F 3/0659* (2013.01); *G06F 3/0685* (2013.01); *G06F 12/0868* (2013.01); *G06F 12/0891* (2013.01); *G06F 12/0893* (2013.01); *G06F 12/1009* (2013.01); *G06F 2212/1021* (2013.01); *G06F 2212/1024* (2013.01); *G06F 2212/1032* (2013.01); *G06F 2212/608* (2013.01)

(58) Field of Classification Search
CPC ...... G06F 12/12; G06F 3/0619; G06F 3/0659; G06F 3/0685; G06F 12/0668; G06F 12/0891; G06F 12/0893; G06F 12/1009
USPC .......................................................... 711/133
See application file for complete search history.

(56) References Cited

U.S. PATENT DOCUMENTS

| | | | | |
|---|---|---|---|---|
| 6,076,139 A | * | 6/2000 | Welker | G06F 12/0292 711/104 |
| 6,976,122 B1 | * | 12/2005 | Sander | G06F 12/0215 711/105 |
| 7,133,995 B1 | * | 11/2006 | Isaac | G06F 12/0215 711/204 |
| 7,877,537 B2 | | 1/2011 | Pesavento et al. | |

(Continued)

FOREIGN PATENT DOCUMENTS

KR 100623892 B1 9/2006

*Primary Examiner* — Pierre Miche Bataille
(74) *Attorney, Agent, or Firm* — William Park & Associates Ltd.

(57) ABSTRACT

A memory system may include a volatile memory, a nonvolatile memory, and a controller. The controller may copy data from a memory to the other memory. The controller may include a page hit detection circuit and a page requester. The page hit detection circuit may generate information regarding page hit and page miss according to whether page information requested from a host and page information of the nonvolatile memory loaded in the volatile memory correspond to each other. The page requester may perform page swapping and transmit a ready response signal to the host.

21 Claims, 9 Drawing Sheets

(56) References Cited

U.S. PATENT DOCUMENTS

| | | | |
|---|---|---|---|
| 2010/0262782 A1* | 10/2010 | Guthrie | G06F 12/0811 711/122 |
| 2011/0197017 A1* | 8/2011 | Yu | G06F 12/0246 711/103 |
| 2012/0159072 A1* | 6/2012 | Hida | G06F 12/0862 711/119 |
| 2013/0080735 A1* | 3/2013 | Kimura | G06F 12/1027 711/207 |
| 2014/0189192 A1* | 7/2014 | Raikin | G06F 12/1027 711/3 |
| 2016/0179700 A1* | 6/2016 | Venkatasubramanian | G06F 12/1045 711/205 |
| 2017/0177500 A1* | 6/2017 | Shanbhogue | G06F 12/0875 |

* cited by examiner

MEMORY SYSTEM HAVING NONVOLATILE MEMORY AND VOLATILE MEMORY

CROSS-REFERENCES TO RELATED APPLICATION

The present application claims priority under 35 U.S.C. § 119(a) to Korean application number 10-2016-0095557 filed on Jul. 27, 2016, in the Korean Intellectual Property Office, which is incorporated herein by reference in its entirety.

BACKGROUND

1. Technical Field

Various embodiments generally relate to a semiconductor technology, and, more particularly, to a memory system.

2. Related Art

Electronic apparatuses may include a large number of electronic components. A computer system, among other electronic apparatuses, may include many semiconductor components such as semiconductor memory devices. For example, a computer system may have a memory module containing one or more semiconductor memory devices on a circuit board with pins connected to other electronic components of the computer system. Examples of the memory module may include a memory module that is used as a temporary storage device. These types of memory modules may include a dual in-line memory module, which generally include one or more volatile memories such as DRAMs. The dual in-line memory module may also include one or more non-volatile memories to retain data even when electrical power is removed either from an unexpected power loss or from a normal system shutdown.

SUMMARY

In an embodiment, a memory system may include a volatile memory, a nonvolatile memory, and a controller. The controller may copy data from a memory to the other memory. The controller may include a page hit detection circuit and a page requester. The page hit detection circuit may generate information regarding page hit and page miss according to whether page information requested from a host and page information of the nonvolatile memory loaded in the volatile memory correspond to each other. The page requester may perform a data input/output operation with the host or change a page of the nonvolatile memory loaded in the volatile memory, based on the information regarding page hit and page miss.

In an embodiment, a method of operating a memory system including a controller, a volatile memory, and a nonvolatile memory may include generating information regarding page hit and page miss by determining whether page information requested from a host and page information of the nonvolatile memory loaded in the volatile memory correspond to each other. The method may include transmitting a ready response signal to the host in the case of a page hit, and performing page swapping and then transmitting the ready response signal to the host in the case of a page miss. The method may include performing a data input/output operation based on the ready response signal.

DETAILED DESCRIPTION

Hereinafter, a nonvolatile memory system using a volatile memory as a cache will be described below with reference to the accompanying drawings through various examples of embodiments.

Figure 1:
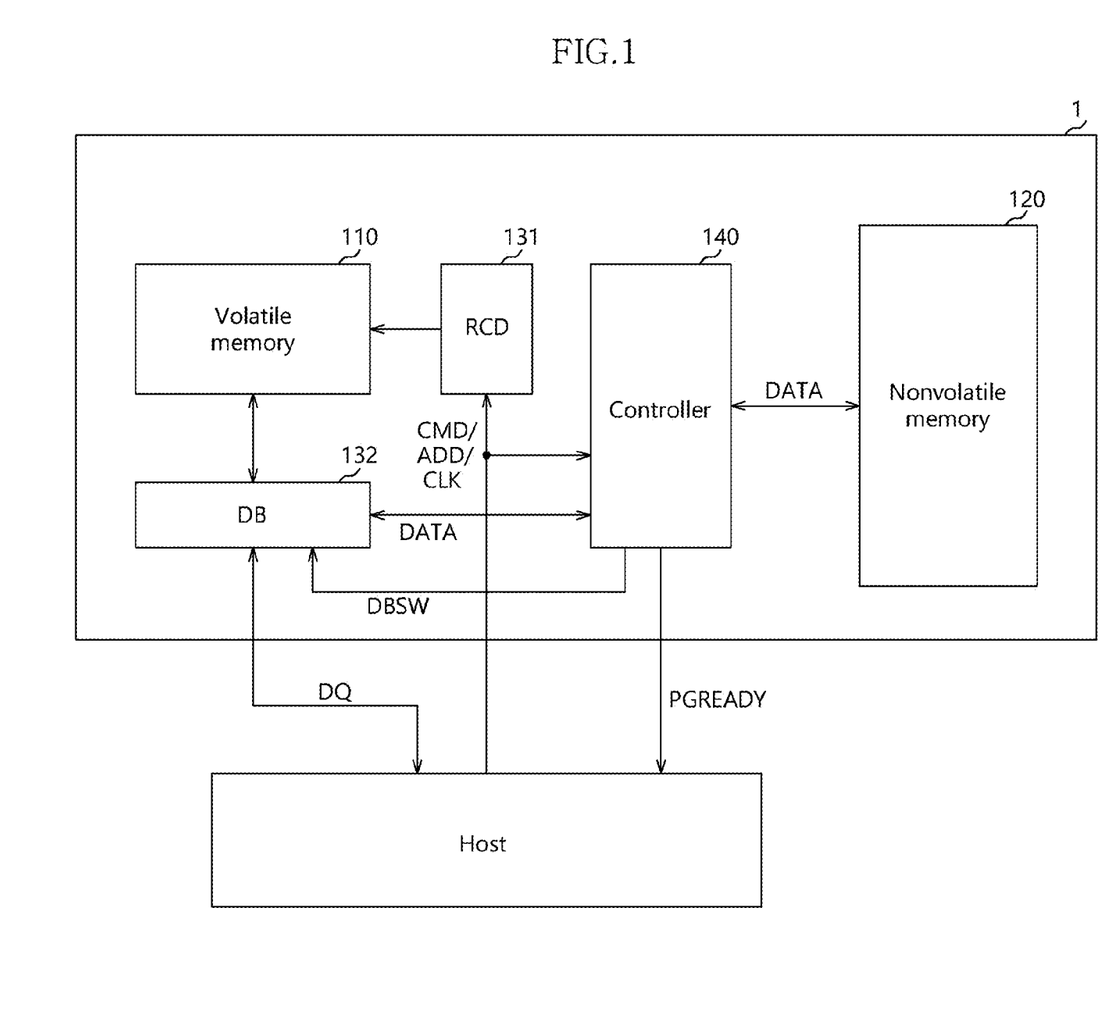
FIG. 1 is a diagram illustrating an example configuration of a memory system in accordance with an embodiment.

FIG. 1 is a diagram illustrating an example configuration of a memory system 1 in accordance with an embodiment. In FIG. 1, the memory system 1 may include a volatile memory 110 and a nonvolatile memory 120. For example, the memory system 1 may be a nonvolatile memory system that retains data even when electrical power is removed either from an unexpected power loss or from a normal system shutdown. The memory system 1 may be a nonvolatile memory module including a volatile memory 110 and a nonvolatile memory 120. The memory system 1 may use the volatile memory 110 as a buffer memory or a cache, and may use the nonvolatile memory 120 as a data storage region. The nonvolatile memory 120 may have a data storage capacity relatively larger than the volatile memory 110. Examples of the volatile memory 110 may include a static RAM (SRAM), a dynamic RAM (DRAM), and a synchronous DRAM (SDRAM). Examples of the nonvolatile memory 120 may include a read only memory (ROM), a programmable ROM (PROM), an electrically erasable and programmable ROM (EEPROM), an electrically programmable ROM (EPROM), a flash memory, a phase change RAM (PRAM), a magnetic RAM (MRAM), a resistive RAM (RRAM), and a ferroelectric RAM (FRAM).

The memory system 1 may include a register clock driver 131 and a data buffer 132. The register clock driver 131 and the data buffer 132 may be coupled to an external device such as a host. The host may include a central processing unit (CPU), a graphic processing unit (GPU), a multimedia processor (MMP) or a digital signal processor (DSP). Also, the host may be realized in the form of a system-on-chip (SOC) by combining processor chips having various functions, such as application processors (APs). The host may provide control signals such as a command signal CMD, an address signal ADD, and a clock signal CLK to the register clock driver 131, thereby controlling the operation of the memory system 1. The register clock driver 131 may buffer the command signal CMD, the address signal ADD, and the clock signal CLK received from the host, and may provide them to the volatile memory 110. The host may transmit data DQ to the data buffer 132 or receive data DQ from the data buffer 132. The data buffer 132 may buffer the data DQ received from the host and provide it to the volatile memory 110, or may output, to the host, the data DQ provided from the volatile memory 110.

The memory system 1 may further include a controller 140. The controller 140 may receive the command signal CMD and the address signal ADD from the host. The controller 140 may generate page hit information. When an access request for a page is received from the host, the controller 140 may compare page information of the nonvolatile memory 120 requested from the host and page information of the nonvolatile memory 120 loaded into the volatile memory 110 (currently stored in the volatile memory 110), and may generate the page hit information. For example, when a request has been made by the host to access a page, the controller 140 may compare the page information (e.g., page address) of the nonvolatile memory 120 requested from the host and the page information (e.g., page address) of the nonvolatile memory 120 currently stored in the volatile memory 110, and may generate the page hit information if a match is found. The controller 140 may perform a page swapping operation when the match is not found. When the page information of the nonvolatile memory 120 requested by the host corresponds to the page information of the nonvolatile memory 120 loaded into (e.g., currently stored in) the volatile memory 110, the controller 140 may transmit a ready response signal PGREADY to the host, and a data input/output operation may be performed between the host and the volatile memory 110. When the page information requested by the host does not correspond to the page information of the nonvolatile memory 120 loaded into (e.g., currently stored in) the volatile memory 110, the controller 140 may copy data DATA from the volatile memory 110 to the nonvolatile memory 120, and map an address of the volatile memory 110 to the page of the nonvolatile memory 120 corresponding to the page information requested from the host. The controller 140 may generate a data switching signal DBSW in order to copy the data DATA from the volatile memory 110 to the nonvolatile memory 120. In response to the data switching signal DBSW, the volatile memory 110 may become coupled to the controller 140, and the copying of the data DATA (e.g., backup and restoration) between the volatile memory 110 and the nonvolatile memory 120 may be performed. If the page swapping operation is completed, the controller 140 may transmit the ready response signal PGREADY to the host.

Figure 2:
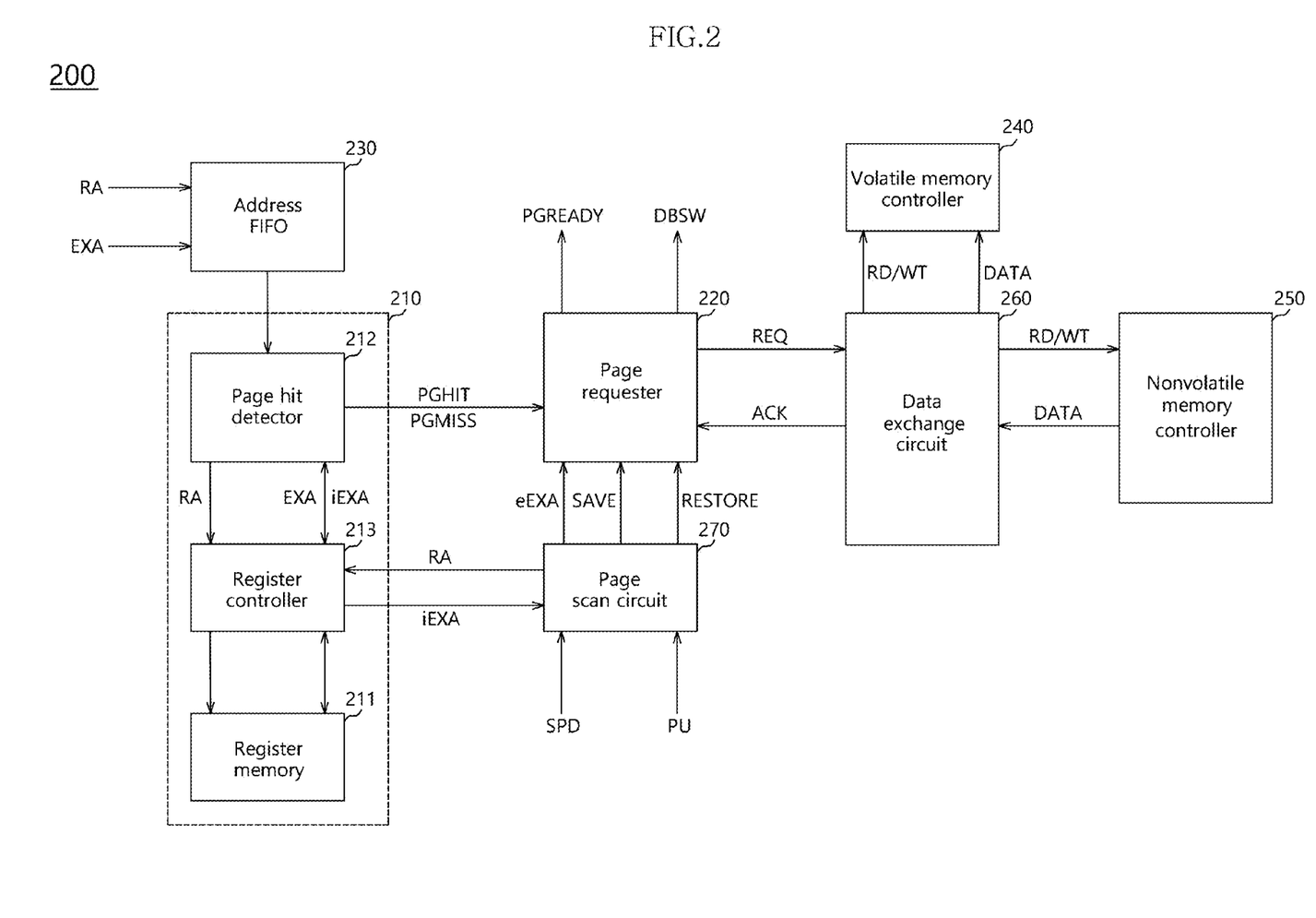
FIG. 2 is a diagram illustrating an example configuration of a controller in accordance with an embodiment.

FIG. 2 is a diagram illustrating an example configuration of a controller 200 in accordance with an embodiment. The concept of the controller 200 that will be discussed below may be applied to the controller 140 illustrated in FIG. 1. In a case where the memory system 1 is a nonvolatile memory module, the controller 200 may serve as a module controller. In FIG. 2, the controller 200 may include a page hit detection circuit 210 and a page requester 220. The page hit detection circuit 210 may generate information regarding page hit/page miss such as a page hit signal PGHIT and a page miss signal PGMISS according to whether the page information requested from the host and the page information loaded in the volatile memory 110 correspond to each other. The page information requested from the host may include the address signal ADD. The address signal ADD may include a page address RA and an extended address EXA. A page may be a unit of data that can be stored in the volatile memory 110 and the nonvolatile memory 120. For example, the page may mean a unit of data for memory management.

The page hit detection circuit 210 may include a register memory 211 and a page hit detector 212. The register memory 211 may store the page information of the nonvolatile memory 120 loaded in a page of the volatile memory 110. The page hit detection circuit 210 may obtain the page information of the nonvolatile memory 120 loaded in a page of the volatile memory 110, from the register memory 211. The register memory 211 may store the page information of the nonvolatile memory 120 mapped to a page of the volatile memory 110 corresponding to the page address RA. As will be described later in detail, the register memory 211 may use the page address RA as an index, and may store the extended address EXA corresponding to the page address RA received from the host, as extended address information iEXA. The page hit detector 212 may compare the extended address EXA received from the host with the extended address information iEXA stored in the register memory 211 and corresponding to the page address RA received from the host, and may generate the page hit signal PGHIT and/or the page miss signal PGMISS. The register memory 211 may be realized by using, for example, a static random access memory (SRAM), and the page hit detection circuit 210 may further include a register controller 213 for controlling the register memory 211. If the register memory 211 is a SRAM, the register controller 213 may be an SRAM controller. The register controller 213 may input information to the register memory 211 or output the information stored in the register memory 211 under the control of the page hit detector 212.

Figure 3:
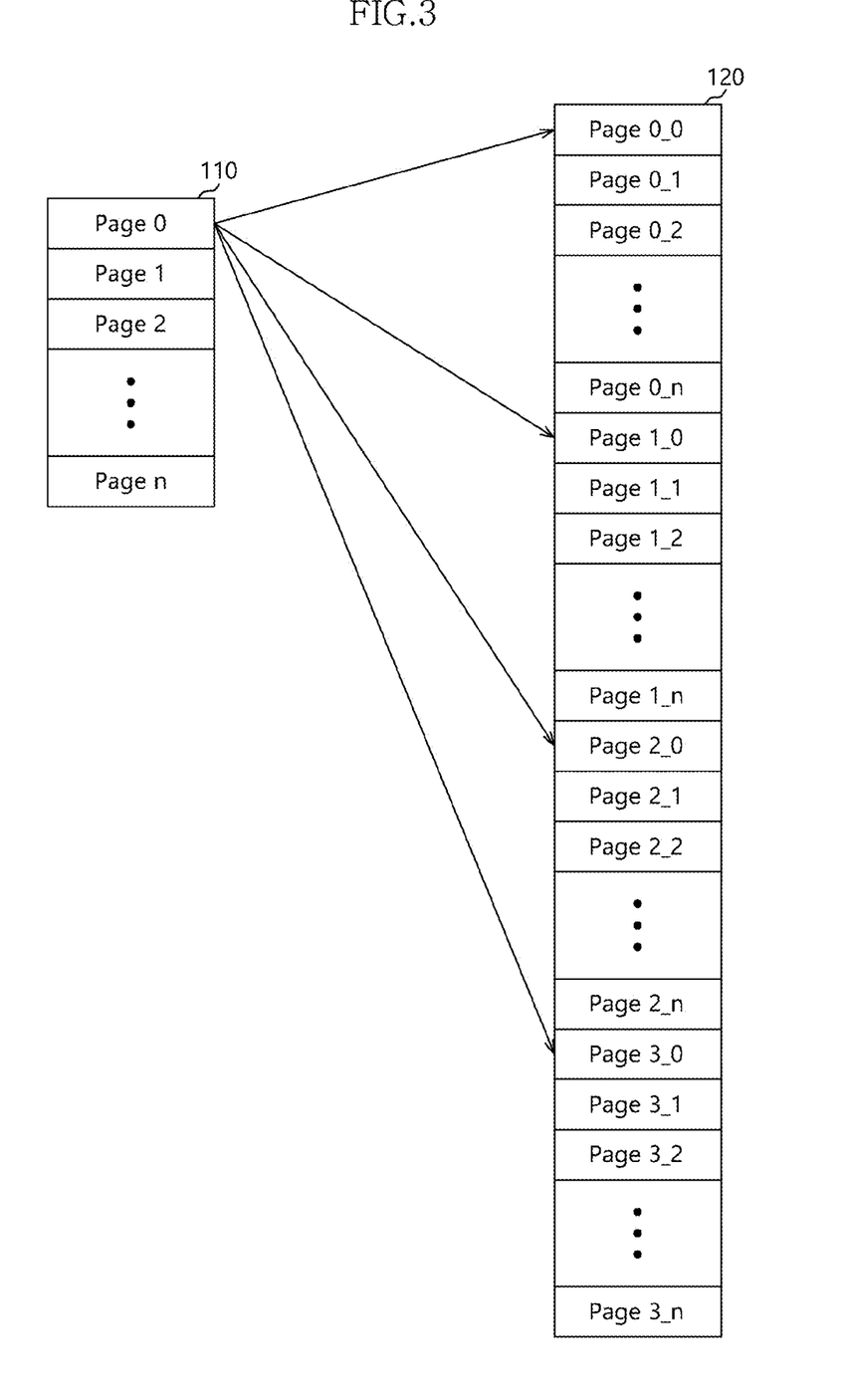
FIG. 3 is a diagram conceptually illustrating an example configuration of the volatile memory and the nonvolatile memory illustrated in FIG. 1.

FIG. 3 is a diagram conceptually illustrating an example configuration of the volatile memory 110 and the nonvolatile memory 120 illustrated in FIG. 1. Referring to FIG. 3, the nonvolatile memory 120 may have a storage capacity larger than the volatile memory 110. A page of the volatile memory 110 may be mapped with a page of the nonvolatile memory 120. A page of the volatile memory 110 may be mapped with a page of the nonvolatile memory 120 based on the page address RA and the extended address EXA. The volatile memory 110 may include a plurality of pages. For example, the volatile memory 110 may include (n+1) number of pages Page 0 to Page n. The number of the pages may correspond to the number of word lines disposed in the memory cell array of the volatile memory 110. The page address RA may be page information indicating each page of the volatile memory 110. The nonvolatile memory 120 may include a plurality of pages. The nonvolatile memory 120 may include a plurality of page groups. The number of pages each page group has may correspond to the number of the pages of the volatile memory 110, and the number of the groups may correspond to the extended address EXA. For example, the nonvolatile memory 120 may include first to fourth groups, and the first to fourth groups may include first to n^th pages Page 0_0 to Page 0_n, Page 1_0 to Page 1_n, Page 2_0 to Page 2_n and Page 3_0 to Page 3_n, respectively. The first pages Page 0_0, Page 1_0, Page 2_0 and Page 3_0 of the first to fourth groups may be mapped with the first page Page 0 of the volatile memory 110. Each of the first pages Page 0_0, Page 1_0, Page 2_0 and Page 3_0 of the first to fourth groups may be defined by the page address RA and the extended address EXA.

For example, if the page address RA is information corresponding to the first page Page 0 and the extended address EXA is information corresponding to the first group, the first page Page 0 of the volatile memory 110 may be mapped with the first page Page 0_0 of the first group in the nonvolatile memory 120. If the page address RA is information corresponding to the first page Page 0 and the extended address EXA is information corresponding to the third group, the first page Page 0 of the volatile memory 110 may be mapped with the first page Page 2_0 of the third group in the nonvolatile memory 120.

Referring to FIG. 2, the controller 200 may further include an address FIFO 230. The address FIFO 230 may store the page address RA and the extended address EXA received from the host. The address FIFO 230 may store sequentially a plurality of page addresses RA and a plurality of extended addresses EXA, which are input successively. For example, the address FIFO 230 may store four pairs of page addresses RA and extended addresses EXA, and the four pairs of page addresses RA and extended addresses EXA may be information that is used to access the pages of different memory banks. In response to the page address RA and the extended address EXA from the address FIFO 230, the page hit detector 212 may compare the extended address EXA with the extended address information iEXA stored in the register memory 211, and may generate the page hit signal PGHIT and/or the page miss signal PGMISS.

The page hit signal PGHIT may be generated when the page information requested from the host matches the page information of the nonvolatile memory 120 currently loaded in (e.g., currently stored in) the volatile memory 110. The page miss signal PGMISS may be generated when the page information requested from the host does not match the page information of the nonvolatile memory 120 currently loaded (e.g., currently stored) in the volatile memory 110. The page hit detector 212 may provide, to the register controller 213, the page address RA received from the host, and the register controller 213 may provide, to the page hit detector 212, the extended address information iEXA corresponding to the page address RA in the register memory 211. The page hit detector 212 may compare the extended address EXA received from the host with the extended address information iEXA, and may generate the page hit signal PGHIT and/or the page miss signal PGMISS.

Referring to FIG. 2, the page requester 220 may receive the page hit signal PGHIT and/or the page miss signal PGMISS generated from the page hit detection circuit 210. The page requester 220 may generate the ready response signal PGREADY depending on which of the page hit signal PGHIT and the page miss signal PGMISS has been issued. The page requester 220 may send the ready response signal PGREADY to the host when the page hit signal PGHIT has been issued by the page hit detection circuit 210. The ready response signal PGREADY may indicate that the memory system 1 has become available for communication between the host and at least one of the memories of the memory system 1. The page requester 220 may change the page of the nonvolatile memory 120 loaded in the volatile memory 110 when the page miss signal PGMISS is issued by the page hit detection circuit 210. In other words, the page requester 220 may cause the page of the nonvolatile memory 120 corresponding to the page address RA and the extended address EXA, to be loaded in the volatile memory 110. In order to change the page of the nonvolatile memory 120 loaded in the volatile memory 110, the page requester 220 may generate the data switching signal DBSW. A data exchange may be performed between the volatile memory 110 and the nonvolatile memory 120 in response to a data exchange request REQ generated by the page requester 220. The page requester 220 may send the ready response signal PGREADY to the host when the data exchange between the volatile memory 110 and the nonvolatile memory 120 is completed, and the page of the nonvolatile memory 120 corresponding to the page address RA and the extended address EXA is loaded in the volatile memory 110.

The controller 200 may further include a volatile memory controller 240, a nonvolatile memory controller 250, and a data exchange circuit 260. The volatile memory controller 240 may control the volatile memory 110. The volatile memory controller 240 may control the data input/output operation of the volatile memory 110 based on control signals issued by the page requester 220. The nonvolatile memory controller 250 may control the nonvolatile memory 120. The nonvolatile memory controller 250 may control the data input/output operation of the nonvolatile memory 120 based on control signals issued by the page requester 220. The data exchange circuit 260 may receive the data exchange request REQ from the page requester 220. The data exchange circuit 260 may provide a read signal RD to the volatile memory controller 240 and provide a write signal WT to the nonvolatile memory controller 250, based on the data exchange request REQ. The data exchange circuit 260 may store data DATA output from the volatile memory 110, in the nonvolatile memory 120, by providing the read signal RD and the write signal WT. If the data DATA is moved (e.g., copied) from the volatile memory 110 to the nonvolatile memory 120, the data exchange circuit 260 may provide an exchange completion signal ACK to the page requester 220. The page requester 220 may send the ready response signal PGREADY to the host in response to the exchange completion signal ACK. The data exchange circuit 260 may include a finite state machine, which is able to sequentially perform predetermined algorithms based on the data exchange request REQ.

Figure 4:
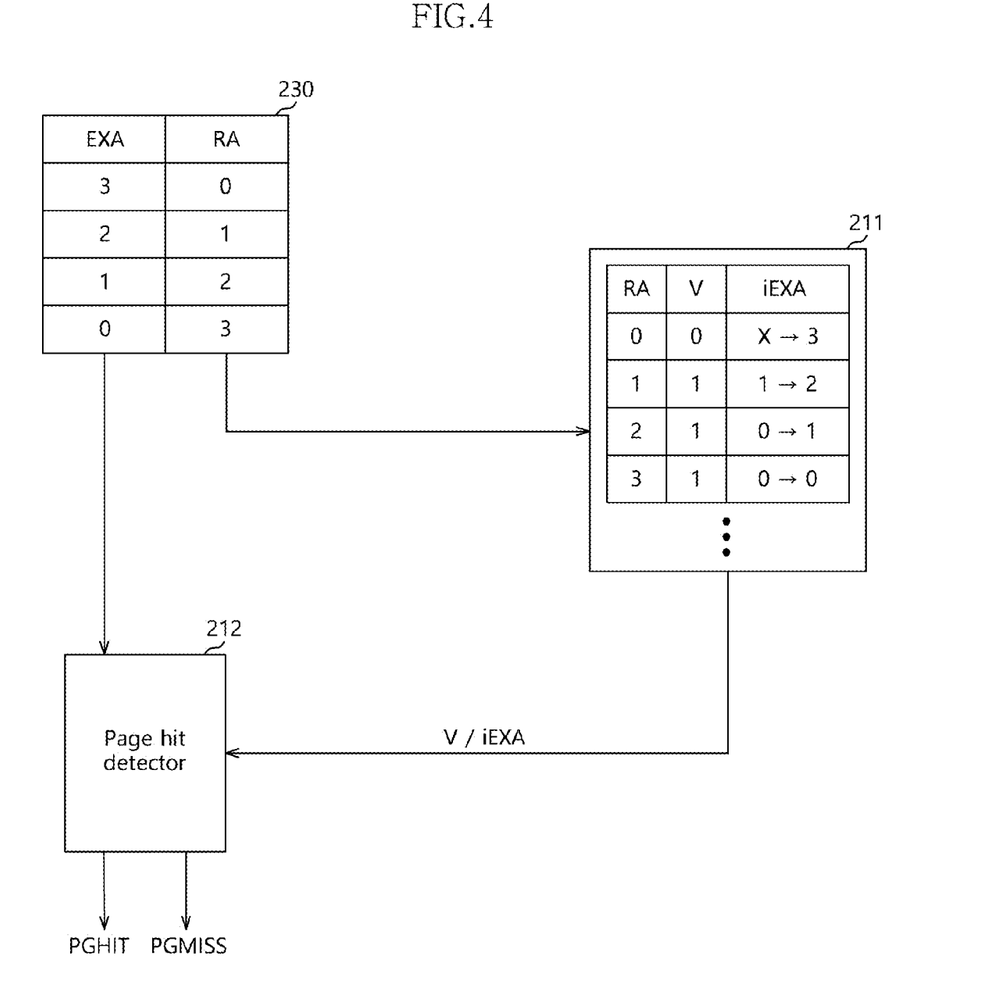
FIG. 4 is a representation of an example of the operation of the page hit detection circuit illustrated in FIG. 2.

FIG. 4 is a representation of an example of the operation of the page hit detection circuit 210 illustrated in FIG. 2. Referring to FIG. 4, the register memory 211 may have the page address RA as an index, and may store mapping validity information V and the extended address information iEXA. The mapping validity information V may be information defining whether a page of the volatile memory 110 and a page of the nonvolatile memory 120 are mapped validly or not. The mapping validity information V may be, for example, 1-bit information. For example, "1" of the mapping validity information V may indicate that a page of the volatile memory 110 corresponding to the page address RA is validly mapped with a page of the nonvolatile memory 120 according to the page address RA and the extended address EXA, and "0" of the mapping validity information V may indicate that a page of the volatile memory 110 is not mapped with a page of the nonvolatile memory 120. If the mapping validity information V is "1," and if the extended address information iEXA stored in the register memory 211 and the extended address EXA received from the host correspond to each other, the page hit detector 212 may generate the page hit signal PGHIT. Also, the page hit detector 212 may generate the page hit signal PGHIT even when the mapping validity information V is "0." Even if the mapping validity information V is "1," the page hit detector 212 may generate the page miss signal PGMISS if the extended address information iEXA stored in the register memory 211 does not match the extended address EXA received from the host.

As described above, the page address RA and the extended address EXA received from the host may be stored in the address FIFO 230. In an example where the address FIFO 230 stores four pairs of page addresses RA and extended addresses EXA, when a page address RA0 corresponding to a first page is received and an extended address EXA3 corresponding to a fourth group is input, the page address RA0 may be provided to the register controller 213. The register controller 213 may provide the mapping validity information V and the extended address information iEXA associated with the page address RA0, among the information stored in the register memory 211, to the page hit detector 212. As illustrated in FIG. 4, when the mapping validity information V is "0," the page hit detector 212 may generate the page hit signal PGHIT, and the register controller 213 may update the mapping validity information V of the register memory 211 to "1" and update the extended address information iEXA to a value corresponding to the extended address EXA3 associated with the fourth group.

In the example where the address FIFO 230 stores four pairs of page addresses RA and extended addresses EXA, when a page address RA1 corresponding to a second page is received and an extended address EXA2 corresponding to a third group is input, the page address RA1 may be provided to the register controller 213. The register controller 213 may provide the mapping validity information V and the extended address information iEXA associated with the page address RA1, among the information stored in the register memory 211, to the page hit detector 212. When the mapping validity information V stored in the register memory 211 is "1" and the extended address information iEXA is associated with a second group, the page hit detector 212 may generate the page miss signal PGMISS since the extended address information iEXA stored in the register memory 211 and the extended address EXA2 received from the host do not correspond to each other. The register controller 213 may retain the mapping validity information V of the register memory 211, and may update the extended address information iEXA of the register memory 211 to a value corresponding to the extended address EXA2 associated with the third group.

In the example where the address FIFO 230 stores four pairs of page addresses RA and extended addresses EXA, when a page address RA2 corresponding to a third page is received and an extended address EXA1 corresponding to the second group is input, the page address RA2 may be provided to the register controller 213. The register controller 213 may provide the mapping validity information V and the extended address information iEXA associated with the page address RA2, among the information stored in the register memory 211, to the page hit detector 212. When the mapping validity information V stored in the register memory 211 is "1" and the extended address information iEXA is associated with a first group, the page hit detector 212 may generate the page miss signal PGMISS since the extended address information iEXA stored in the register memory 211 and the extended address EXA1 received from the host do not correspond to each other. The register controller 213 may retain the mapping validity information V of the register memory 211, and may update the extended address information iEXA of the register memory 211 to a value corresponding to the extended address EXA1 associated with the second group.

In the example where the address FIFO 230 stores four pairs of page addresses RA and extended addresses EXA, when a page address RA3 corresponding to a fourth page is received and an extended address EXA0 corresponding to the first group is input, the page address RA3 may be provided to the register controller 213. The register controller 213 may provide the mapping validity information V and the extended address information iEXA associated with the page address RA3, among the information stored in the register memory 211, to the page hit detector 212. When the mapping validity information V stored in the register memory 211 is "1" and the extended address information iEXA is associated with the first group, the page hit detector 212 may generate the page hit signal PGHIT since the extended address information iEXA stored in the register memory 211 and the extended address EXA0 received from the host correspond to each other. The register controller 213 may retain the mapping validity information V of the register memory 211, and may retain the extended address information iEXA of the register memory 211.

Figure 5:
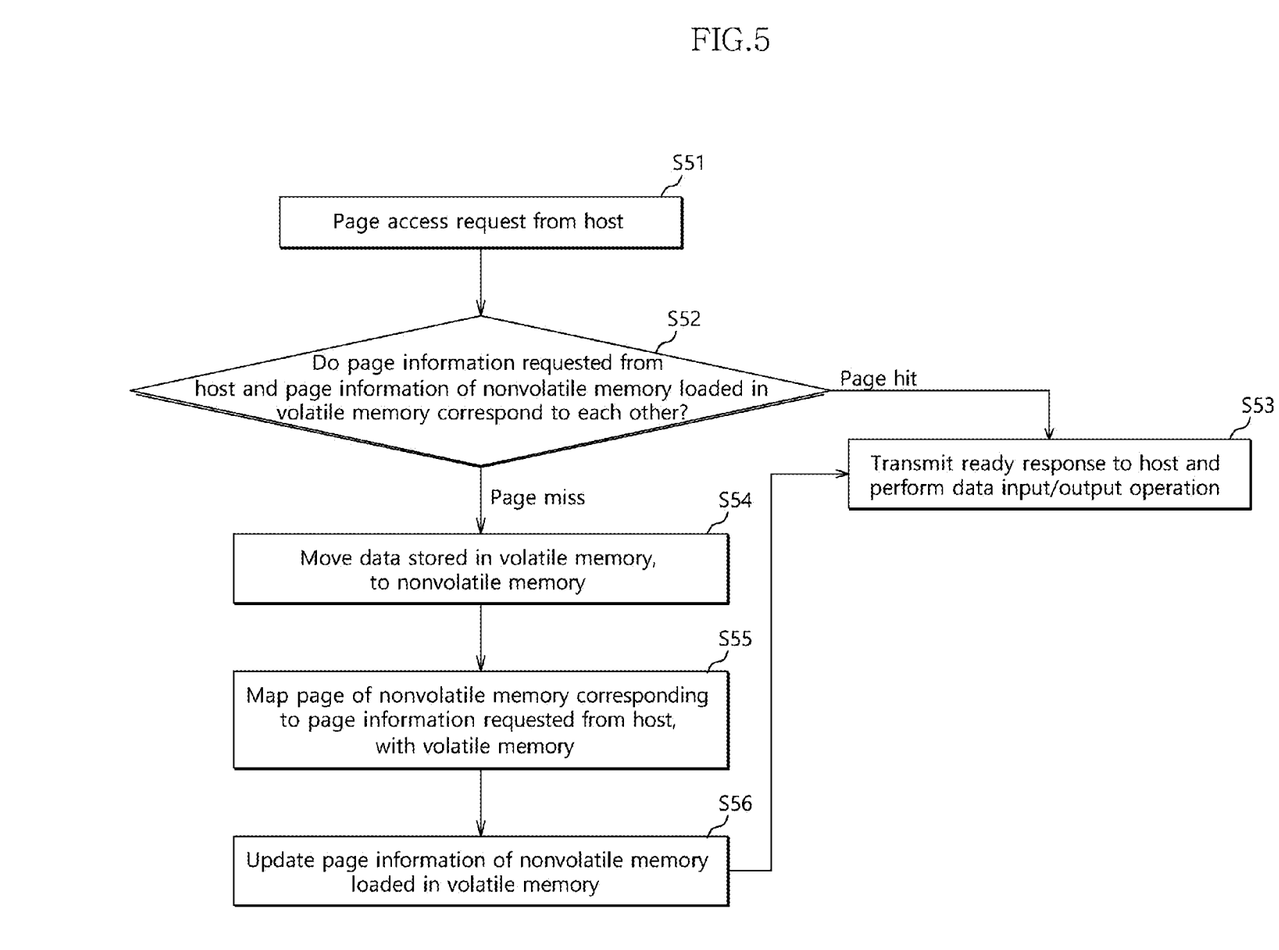
FIG. 5 is a representation of an example of an operation of the memory system in accordance with an embodiment.

FIG. 5 is a representation of an example an operation of the memory system 1 in accordance with an embodiment. The operation of the memory system 1 will be described below with reference to FIGS. 1 to 5. An access to a page may be requested from the host, and the memory system 1 may receive the page address RA and the extended address EXA from the host (S51). The page hit detection circuit 210 may generate the page hit signal PGHIT and/or the page miss signal PGMISS according to whether the page information requested from the host and the page information of the nonvolatile memory 120 loaded in the volatile memory 110 correspond to each other (S52). The page hit detection circuit 210 may generate the page hit signal PGHIT and the page miss signal PGMISS based on whether the extended address EXA received from the host matches the extended address information iEXA stored in the register memory 211 and corresponding to the page address RA received from the host.

If the extended address EXA and the extended address information iEXA correspond to each other, the page hit detection circuit 210 may detect that the page is "hit" and generate the page hit signal PGHIT. The page requester 220 may transmit the ready response signal PGREADY to the host based on the page hit signal PGHIT, and may allow data to be input/output between the host and the memory system 1 (S53).

If the extended address EXA and the extended address information iEXA do not correspond to each other, the page hit detection circuit 210 may detect that the page is "miss" and generate the page miss signal PGMISS. The page requester 220 may move (e.g., copy) the data stored in the volatile memory 110, to the nonvolatile memory 120, based on the page miss signal PGMISS (S54). The page requester 220 may generate the data switching signal DBSW based on the page miss signal PGMISS, and the volatile memory 110 may get coupled to the nonvolatile memory 120. The page requester 220 may provide the data exchange request REQ, and the data exchange circuit 260 may provide the read signal RD to the volatile memory controller 240 and provide the write signal WT to the nonvolatile memory controller 250. Accordingly, the information stored in the page of the volatile memory 110 may be moved (e.g., copied) to a page of the nonvolatile memory 120.

Thereafter, the page of the nonvolatile memory 120 corresponding to the page information requested from the host may be mapped to the volatile memory 110 (S55). If the data stored in the volatile memory 110 is moved (e.g., copied) to the nonvolatile memory 120, and the page of the volatile memory 110 is mapped with the page of the nonvolatile memory 120 corresponding to the page information requested from the host, page swapping may be completed. The page hit detection circuit 210 may update the page information of the nonvolatile memory 120 loaded in the volatile memory 110 (S56). The register controller 213 may update the extended address information iEXA corresponding to the page address RA received from the host, to a value corresponding to the extended address EXA received from the host. If the step is completed, the page requester 220 may transmit the ready response signal PGREADY to the host, and the memory system 1 may perform a data input/output operation with the host (S53).

In FIG. 2, the page hit detection circuit 210 may generate the page hit signal PGHIT and/or the page miss signal PGMISS in an initial operation of the memory system 1 regardless of whether the page information requested from the host and the page information of the nonvolatile memory 120 loaded in the volatile memory 110 correspond to each other. If the memory system 1 is a part of a computer device, and if an operation is started after power is supplied, the page miss signal PGMISS is issued at first because no page of the volatile memory 110 has mapped to a page of the nonvolatile memory 120. Here, the page miss signal PGMISS may be generated until all the pages of the volatile memory 110 are accessed once. Thus, in an embodiment of the present disclosure, the register memory 211 may further store first information (e.g., "F" in FIG. 6). The first information is information for determining whether a page access request from the host to the memory system 1 is a first access request for the memory system 1. Here, the first access request may be an access request made for the first time. The first information may have information regarding whether the access request of the host is a first access request for each page of the volatile memory 110. The page hit detection circuit 210 may generate the page hit signal PGHIT and/or the page miss signal PGMISS not only based on whether the page information requested from the host and the page information of the nonvolatile memory 120 loaded in the volatile memory 110 correspond to each other, but also based on the first information.

Figure 6:
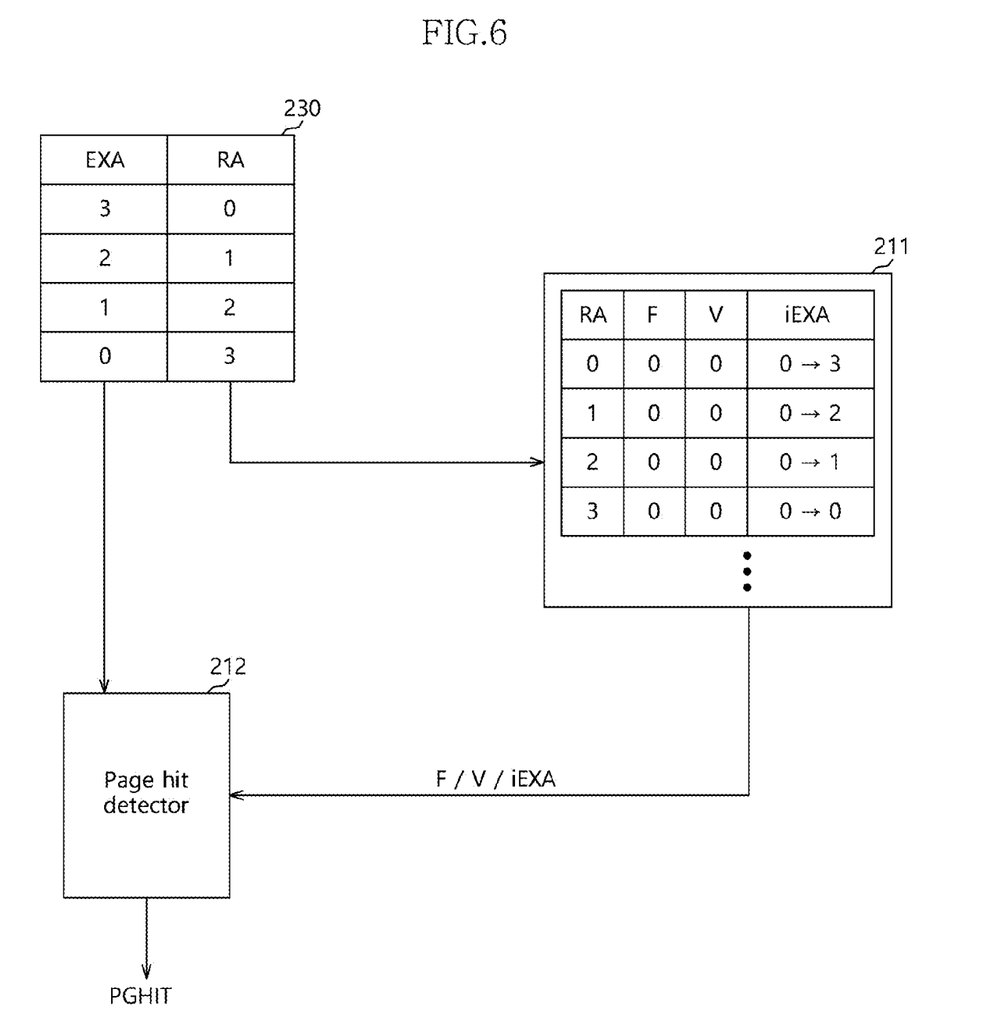
FIG. 6 is a representation of an example of an operation of the page hit detection circuit when a register memory includes first information.

FIG. 6 is a representation of an example of an operation of the page hit detection circuit 210 when the register memory 211 includes first information F. Referring to FIG. 6, the register memory 211 may have the page address RA as an index, and store first information F, mapping validity information V and extended address information iEXA for each page address RA. The first information F may be 1-bit information. In a case where the first information F is "0," the first information F may be information indicating that a corresponding page has not yet been accessed. In a case where the first information F is "1," the first information F may be information indicating that a corresponding page is previously accessed at least once.

If the memory system 1 is a part of a computer device, and if an operation is started after power is supplied, the memory system 1 may receive the page address RA and the extended address EXA from the host. Four pairs of page addresses RA and extended addresses EXA may be received from the host, and the address FIFO 230 may sequentially store and then output the page addresses RA and the extended addresses EXA. Since pages corresponding to all the page addresses RA have not been accessed yet, the register memory 211 may store "0" as the first information F of all the page addresses RA. If a page address RA0 corresponding to a first page is received, the register controller 213 and the register memory 211 may provide the first information F, the mapping validity information V, and the extended address information iEXA corresponding to the page address RA0, to the page hit detector 212. Since the first information F is "0," the page hit detector 212 may generate the page hit signal PGHIT regardless of whether the extended address EXA received from the host and the extended address information iEXA provided from the register memory 211 correspond to each other. Thereafter, the register controller 213 and the register memory 211 may update the first information F for the page address RA0 to "1," update the mapping validity information V to "1," and update the extended address information iEXA to a value corresponding to an extended address EXA3 received from the host.

If page addresses RA1, RA2, and RA3 corresponding to second to fourth pages are received, the register controller 213 and the register memory 211 may provide the first information F, the mapping validity information V and the extended address information iEXA corresponding to each of the page addresses RA1, RA2, and RA3, to the page hit detector 212. Since the first information F is "0," the page hit detector 212 may generate the page hit signal PGHIT. Also, the register controller 213 and the register memory 211 may update and store information for a corresponding page address RA. The first information F for the page address RA1 corresponding to the second page is updated to "1," the mapping validity information V is updated to "1," and the extended address information iEXA is updated to a value corresponding to an extended address EXA2 received from the host. Similarly, the first information F for the page addresses RA2 and RA3 corresponding to the third and fourth pages is updated to "1," the mapping validity information V is updated to "1," and the extended address information iEXA is updated to values corresponding to extended addresses EXA1 and EXA0 respectively received from the host.

Figure 7:
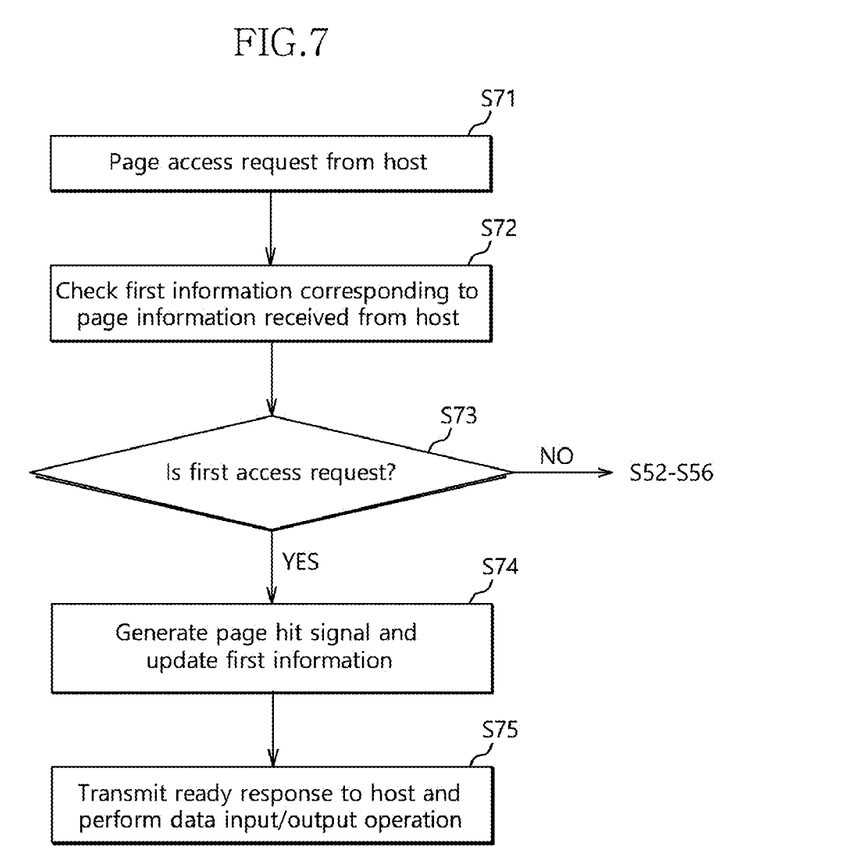
FIG. 7 is a representation of an example of an operation of the memory system in accordance with an embodiment.

FIG. 7 is a representation of an example of an operation of the memory system 1 in accordance with an embodiment. Referring to FIGS. 1 to 7, at an initial operational stage of the memory system 1, the page hit detection circuit 210 may generate the page hit signal PGHIT regardless of whether an extended address corresponds to extended address information, thereby preventing a potential operation delay that may occur due to the generation of the page miss signal PGMISS. The host may request an access to a page of the memory system 1 (S71). The memory system 1 may receive the page address RA and the extended address EXA from the host. The page hit detection circuit 210 may check the first information F corresponding to the page address RA received from the host, and may generate the page hit signal PGHIT and/or the page miss signal PGMISS (S72). The register memory 211 may provide the first information F corresponding to the page address RA received from the host, to the page hit detector 212. The page hit detection circuit 210 may determine whether the page corresponding to the page information received from the host is one that is attempted to be accessed for the first time (S73). The page hit detector 212 may determine whether it is a first access request or not, based on the first information F provided from the register memory 211. When the first information F is "1," the memory system 1 may operate according to the steps S52 to S56 as illustrated in FIG. 5. When the first information F is "0," the page hit detector 212 may generate the page hit signal PGHIT. Further, the register controller 213 and the register memory 211 may update the first information F corresponding to the page address RA received from the host (S74). If the page hit signal PGHIT is generated, the page requester 220 may transmit the ready response signal PGREADY to the host, and the memory system 1 may perform a data input/output operation with the host (S75).

Referring again to FIG. 2, the memory system 1 in accordance with an embodiment may further include a page scan circuit 270. The page scan circuit 270 may scan valid page information when power supply to the memory system 1 is cut off. The page scan circuit 270 may provide the scanned valid page information to the page requester 220 to move (e.g., copy) the data stored in the volatile memory 110, to the nonvolatile memory 120. The page requester 220 may move (e.g., copy) the data stored in a page of the volatile memory 110 corresponding to a valid page, to a corresponding page of the nonvolatile memory 120. The page requester 220 may store the valid page information in a certain page of the nonvolatile memory 120. Thereafter, when power is supplied, the page requester 220 may re-copy the data copied to the page of the nonvolatile memory 120, to the page of the volatile memory 110, based on the valid page information stored in the certain page. Also, the valid page information may be re-copied to the register memory 211.

When power is removed either from an unexpected power loss or from a normal system shutdown, the memory system 1 may provide a power supply cutoff signal SPD to the page scan circuit 270. The memory system 1 may perform a data moving operation by using an auxiliary power supply such as a super capacitor. The page scan circuit 270 may scan the information stored in the register memory 211, based on the power supply cutoff signal SPD. The page scan circuit 270 may scan the extended address information iEXA stored in the register memory 211, and may provide a data move signal SAVE and the scanned information to the page requester 220. The page requester 220 may check the page information of the nonvolatile memory 120 loaded in the volatile memory 110, and may provide the data exchange request REQ to the data exchange circuit 260. The data exchange circuit 260 may provide the read signal RD and the write signal WT to the volatile memory controller 240 and the nonvolatile memory controller 250, respectively, based on the data exchange request REQ, and may move (e.g., copy) the data stored in each page of the volatile memory 110, to a corresponding page of the nonvolatile memory 120. The page requester 220 may move (e.g., copy) valid extended address information eEXA provided from the page scan circuit 270, to a specified page of the nonvolatile memory 120.

Thereafter, if power is supplied to the memory system 1, the memory system 1 may provide a power supply signal PU to the page scan circuit 270. When receiving the power supply signal PU, the page scan circuit 270 may provide a data restoration signal RESTORE to the page requester 220. The page requester 220 may read the valid extended address information eEXA stored in the specified page of the nonvolatile memory 120, in response to the data restoration signal RESTORE. The page requester 220 may generate the data exchange request REQ based on the valid extended address information eEXA. The data exchange circuit 260 may provide the write signal WT and the read signal RD to the volatile memory controller 240 and the nonvolatile memory controller 250, respectively, based on the data exchange request REQ, and may re-copy the data DATA moved to the page of the nonvolatile memory 120, to the volatile memory 110. Also, the valid extended address information eEXA may be re-copied to the register memory 211.

Figure 8:
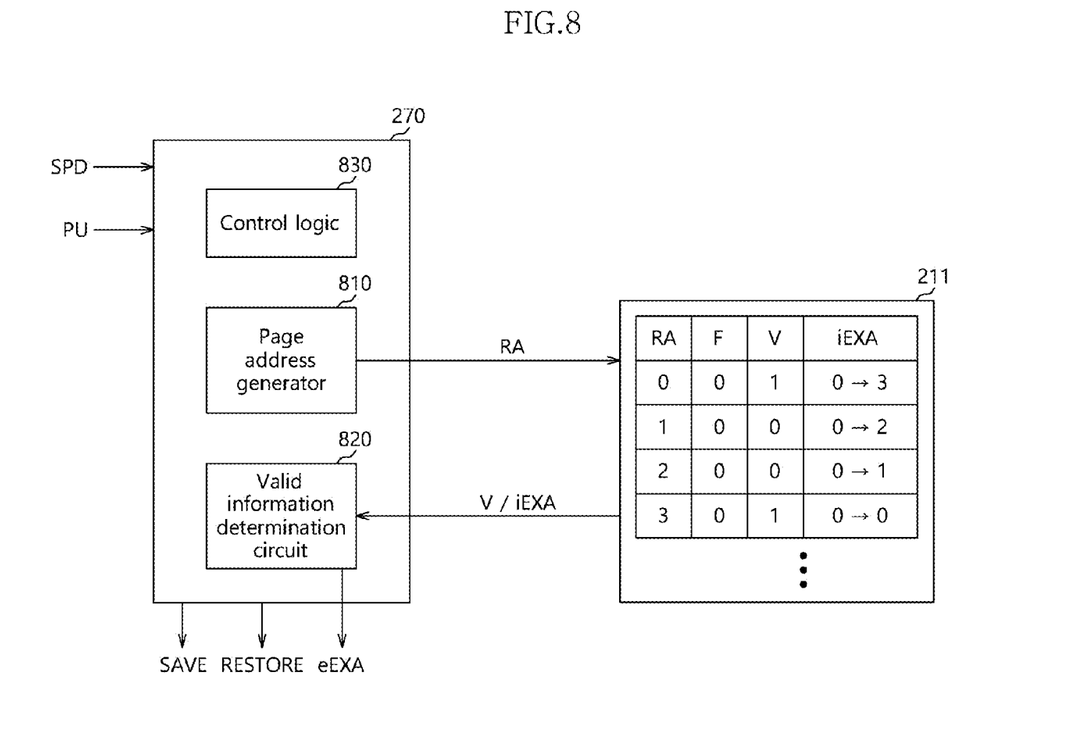
FIG. 8 is a representation of an example of the page scan circuit illustrated in FIG. 2 provided to illustrate an operation of the memory system in accordance with an embodiment.

FIG. 8 is a representation of an example of the page scan circuit 270 illustrated in FIG. 2 and the operation of the memory system 1 in accordance with an embodiment. In FIG. 8, the page scan circuit 270 may include a page address generator 810 and a valid information determination circuit 820. The page address generator 810 may sequentially generate all page addresses RA based on the power supply cutoff signal SPD. For example, the page address generator 810 may sequentially generate the page address RA from the page address RA corresponding to the first page to the page address RA corresponding to the n^th page. The page address generator 810 may be realized by using, for example, a counter circuit. The page address generator 810 may provide the page addresses RA to the register controller 213. The register controller 213 may output the mapping validity information V and the extended address information iEXA stored in the register memory 211, to the valid information determination circuit 820, in response to the page addresses RA. The valid information determination circuit 820 may determine whether the extended address information iEXA stored in the register memory 211 is valid, and may output valid extended address information iEXA to the page requester 220. In FIG. 8, since the mapping validity information V for the page address RA0 corresponding to the first page is "1," the valid information determination circuit 820 may determine that the first page Page 3_0 of the fourth group of the nonvolatile memory 120 is validly loaded in the first page Page 0 of the volatile memory 110. Since the mapping validity information V for the page addresses RA1 and RA2 corresponding to the second and third pages is "0," the valid information determination circuit 820 may determine that the second page Page 2_1 of the third group and the third page Page 1_2 of the second group of the nonvolatile memory 120 are not validly loaded in the second and third pages Page 1 and Page 2 of the volatile memory 110. Since the mapping validity information V for the page address RA3 corresponding to the fourth page is "1," the valid information determination circuit 820 may determine that the fourth page Page 0_3 of the first group of the nonvolatile memory 120 is validly loaded in the fourth page Page 3 of the volatile memory 110. The valid information determination circuit 820 may provide the extended address information iEXA validly loaded in the volatile memory 110, as the valid extended address information eEXA, to the page requester 220. The page scan circuit 270 may further include a control logic 830. The control logic 830 may control the operation of the page address generator 810 based on the power supply cutoff signal SPD, and may generate the data move signal SAVE. Furthermore, the control logic 830 may control the valid information determination circuit 820 such that the valid extended address information eEXA generated in the valid information determination circuit 820 is output to the page requester 220. The control logic 830 may generate the data restoration signal RESTORE based on the power supply signal PU.

Figure 9:
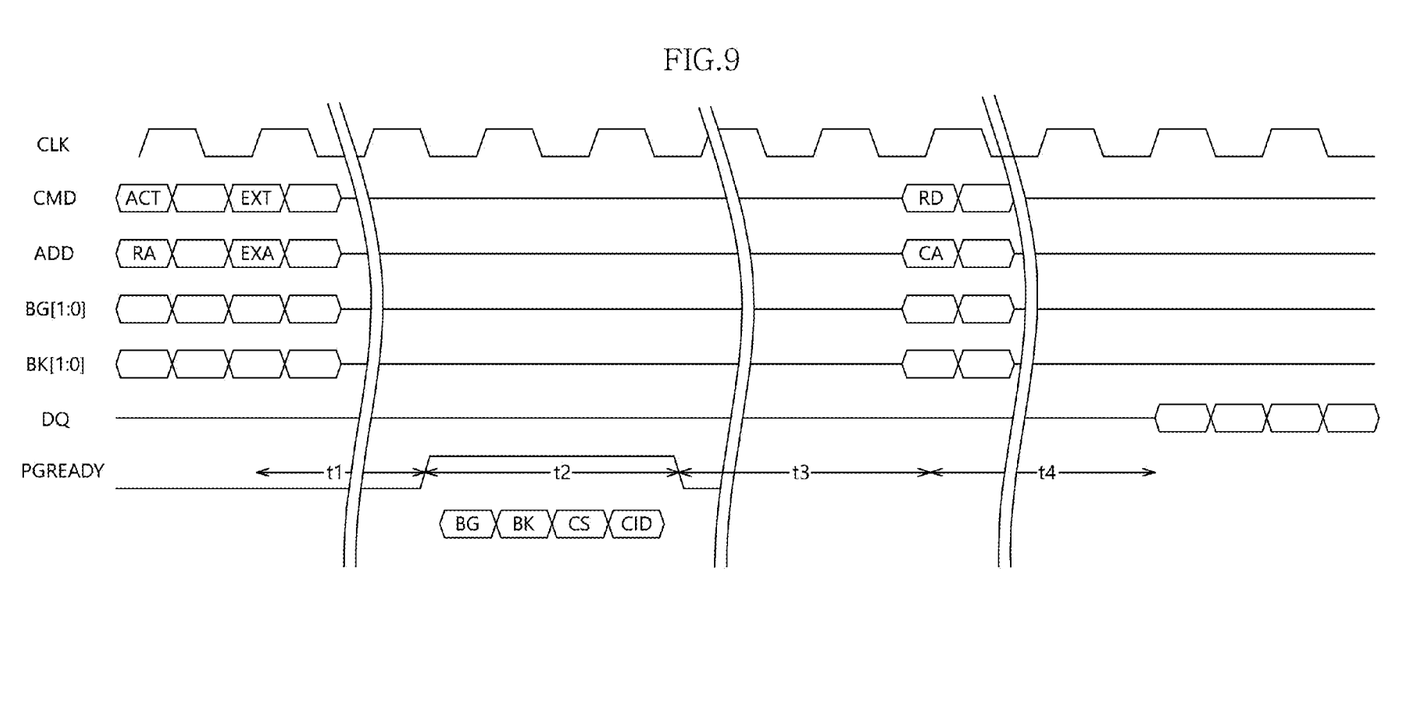
FIG. 9 is a representation of an example of a timing diagram of signals transmitted between the memory system and a host.

The memory system 1 in accordance with an embodiment may communicate with the host through an interface scheme associated with the volatile memory 110. FIG. 9 is a representation of an example of a timing diagram of signals transmitted between the memory system 1 and the host. The communication scheme of the memory system 1 in accordance with an embodiment and the host will be described below with reference to FIGS. 1 to 9. In FIG. 9, the host may provide the command signal CMD to the memory system 1 in synchronization with the clock signal CLK, and may provide signals such as the address signal ADD, a bank group address BG<1:0>, and a bank address BK<1:0> together with the command signal CMD. The command signal CMD may be an active command ACT, and the address signal ADD may be the page address RA. Also, the host may provide an extended command signal EXT to the memory system 1, and may provide signals such as the extended address EXA, the bank group address BG<1:0>, and the bank address BK<1:0> in synchronization with the clock signal CLK. Alternatively, it is possible for the host to not provide the extended command signal EXT to the memory system 1. The extended address EXA may be received through, for example, an RFU (reserved for future use) in which no command is input actually. The register clock driver 131 may buffer the signals received from the host, and may provide them to the volatile memory 110 and the controller 200. The controller 200 may compare the page information requested from the host and the page information of the nonvolatile memory 120 loaded in the volatile memory 110, based on the page address RA and the extended address EXA, and may generate the page hit information. In the case where the page information loaded in the volatile memory 110 is different from the page information requested from the host, the controller 200 may perform the page swapping operation. The controller 200 may determine whether the page is "hit" and perform the page swapping, for a period of time t1. If the page swapping is completed, the controller 200 may transmit the ready response signal PGREADY to the host. The ready response signal PGREADY may include, for example, a specified bank group address BG, a specified bank address BK, a chip select signal CS, and a chip identification signal CID, and may have information on a specified page of the volatile memory 110. That is to say, in order to identify the plurality of pages of the volatile memory 110, the controller 200 may transmit ready response signals PGREADY which are configured differently for the pages of the volatile memory 110. For example, the ready response signal PGREADY may be output through an RFU, a pin or pad which does not have a specified coupling relationship. If a period of time t2 for which the ready response signal PGREADY is transmitted, the host may perform the data input/output operation with the memory system 1. For example, the host may be ready for the data output operation for a period of time t3 in response to the ready response signal PGREADY, may transmit a read command RD to the memory system 1 in synchronization with the clock signal CLK, and may provide signals such as a column address CA, the bank group address BG<1:0>, and the bank address BK<1:0> together with the read command RD. After a period of time t4 corresponding to a latency, data DQ may be output from the memory system 1 to the host.

While various embodiments have been described above, it will be understood to those skilled in the art that the embodiments described are examples only. Accordingly, the nonvolatile memory system using a volatile memory as a cache described herein should not be limited based on the described embodiments.

What is claimed is:

1. A memory system comprising:
    a volatile memory;
    a nonvolatile memory; and
    a controller configured to copy data from a memory to the other memory, the controller comprising:
    a page hit detection circuit configured to generate information regarding page hit and page miss according to whether page information requested from a host and page information of the nonvolatile memory loaded in the volatile memory correspond to each other; and
    a page requester configured to perform a data input/output operation with the host based on the information regarding page hit, and copy data stored in the volatile memory to the nonvolatile memory and change a page of the nonvolatile memory loaded in the volatile memory based on the information regarding page miss,
    wherein the page hit detection circuit comprises a register memory configured to store the page information of the nonvolatile memory loaded in the volatile memory and a page hit detector configured to compare an extended address received from the host and extended address information stored in the register memory, based on a page address received from the host, and generate the information regarding page hit and page miss.

2. The memory system according to claim 1, wherein the register memory stores mapping validity information and extended address information for each page address by using each page address as an index.

3. The memory system according to claim 1, wherein the information regarding page hit and page miss includes a page hit signal and a page miss signal, and the page hit detector generates the page hit signal when the extended address received from the host corresponds to the extended address information stored in the register memory, and generates the page miss signal when the extended address received from the host does not correspond to the extended address information stored in the register memory.

4. The memory system according to claim 3, wherein the page requester transmits a ready response signal to the host based on the page hit signal.

5. The memory system according to claim 4, wherein the page requester copies data stored in the volatile memory to the nonvolatile memory, and maps a page of the nonvolatile memory corresponding to the page information requested from the host, with the volatile memory, based on the page miss signal.

6. The memory system according to claim 5, wherein the register memory updates page information of the nonvolatile memory loaded in the volatile memory.

7. The memory system according to claim 6, further comprising:
    a register controller configured to provide the extended address information stored in the register memory to the page hit detector, based on the page address, and update the extended address information.

8. The memory system according to claim 5, further comprising:
    a volatile memory controller configured to control the volatile memory;
    a nonvolatile memory controller configured to control the nonvolatile memory; and
    a data exchange circuit configured to provide one of a read signal and a write signal to the volatile memory controller and the nonvolatile memory controller, respectively, based on the page miss signal.

9. The memory system according to claim 1, wherein:
    the register memory further stores information on whether an access request for a page of the nonvolatile memory is a first access request; and
    when an access request for a page of the nonvolatile memory corresponding to page information requested from the host is a first access request, the page hit detection circuit generates the page hit signal regardless of whether page information requested from the host and page information of the nonvolatile memory loaded in the volatile memory correspond to each other.

10. A memory system comprising:
    a volatile memory;
    a nonvolatile memory; and
    a controller configured to copy data from a memory to the other memory, the controller comprising:
    a page hit detection circuit configured to generate information regarding page hit and page miss according to whether page information requested from a host and page information of the nonvolatile memory loaded in the volatile memory correspond to each other;
    a page requester configured to perform a data input/output operation with the host or change a page of the nonvolatile memory loaded in the volatile memory based on the information regarding page hit and page miss; and a page scan circuit configured to detect whether power is supplied or not, and scan valid page information stored in the register memory and provide a data move signal to the page requester when power supply is cut off, wherein the page requester copies data loaded in the volatile memory to corresponding pages of the nonvolatile memory, according to the data move signal and the valid page information.

11. The memory system according to claim 10, wherein the page requester stores the valid page information in a certain page of the nonvolatile memory.

12. The memory system according to claim 10, wherein:
the page scan circuit provides a data restoration signal to the page requester when power is supplied; and
the page requester re-copies, to the volatile memory, the data copied to the pages of the nonvolatile memory, according to the data restoration signal.

13. A method of operating a memory system including a controller, a volatile memory, and a nonvolatile memory, the method comprising:
generating information regarding page hit and page miss by determining whether page information requested from a host and page information of the nonvolatile memory loaded in the volatile memory correspond to each other;
transmitting a ready response signal to the host in the case of a page hit, and performing page swapping and then transmitting the ready response signal to the host in the case of a page miss; and
performing a data input/output operation based on the ready response signal.

14. The method according to claim 13, wherein:
generating the information regarding page hit and page miss comprises checking first information corresponding to the page information requested from the host; and
when a page corresponding to the page information requested from the host is accessed for the first time, the ready response signal is transmitted regardless of whether the page information requested from the host and the page information of the nonvolatile memory loaded in the volatile memory correspond to each other.

15. The method according to claim 14, wherein generating the information regarding page hit and page miss is performed when a page corresponding to the page information requested from the host is not one that is accessed for the first time.

16. The method according to claim 13, wherein performing the page swapping comprises:
copying data stored in pages of the volatile memory to corresponding pages of the nonvolatile memory; and
mapping a page of the volatile memory with a page of the nonvolatile memory corresponding to the page information requested from the host.

17. The method according to claim 13, wherein the page information requested from the host includes a page address and an extended address.

18. The method according to claim 17, wherein the host transmits a write command or a read command to the memory system, together with a column address, based on the ready response.

19. The method according to claim 13, further comprising:
scanning valid page information and copying data stored in pages of the volatile memory corresponding to the valid page information to corresponding pages of the nonvolatile memory, when power supply is cut off.

20. The method according to claim 19, further comprising:
storing the valid page information in a certain page of the nonvolatile memory.

21. The method according to claim 20, further comprising:
re-copying, to the pages of the volatile memory, the data copied to the pages of the nonvolatile memory, based on the valid page information stored in the certain page, when power is supplied.

* * * * *